United States Patent [19]

Anthony et al.

[11] Patent Number: 4,499,224

[45] Date of Patent: Feb. 12, 1985

[54] UPGRADING SILICONE RESIN COATING COMPOSITIONS

[75] Inventors: Blair T. Anthony, Schenectady; Donald G. LeGrand, Burnt Hills, both of N.Y.

[73] Assignee: General Electric Company, Schenectady, N.Y.

[21] Appl. No.: 572,482

[22] Filed: Jan. 20, 1984

[51] Int. Cl.$^3$ ............................................. C08K 3/36
[52] U.S. Cl. .................................. 524/261; 524/588; 524/858
[58] Field of Search ...................... 524/588, 858, 261

[56] References Cited

U.S. PATENT DOCUMENTS

| | | | |
|---|---|---|---|
| 3,986,997 | 10/1976 | Clark | 260/29.2 M |
| 4,197,230 | 4/1980 | Baney et al. | 524/837 |
| 4,368,235 | 1/1983 | Vaughn | 524/767 |
| 4,395,461 | 7/1983 | Ching | 524/858 |
| 4,413,088 | 11/1983 | Frye | 524/714 |

Primary Examiner—Lewis T. Jacobs
Attorney, Agent, or Firm—Richard J. Traverso; James C. Davis, Jr.; James Magee, Jr.

[57] ABSTRACT

A method of upgrading silicon resin coating compositions is provided wherein the coating compositions are filtered prior to application on a substrate. The filters utilized are 5 microns or less.

9 Claims, 1 Drawing Figure

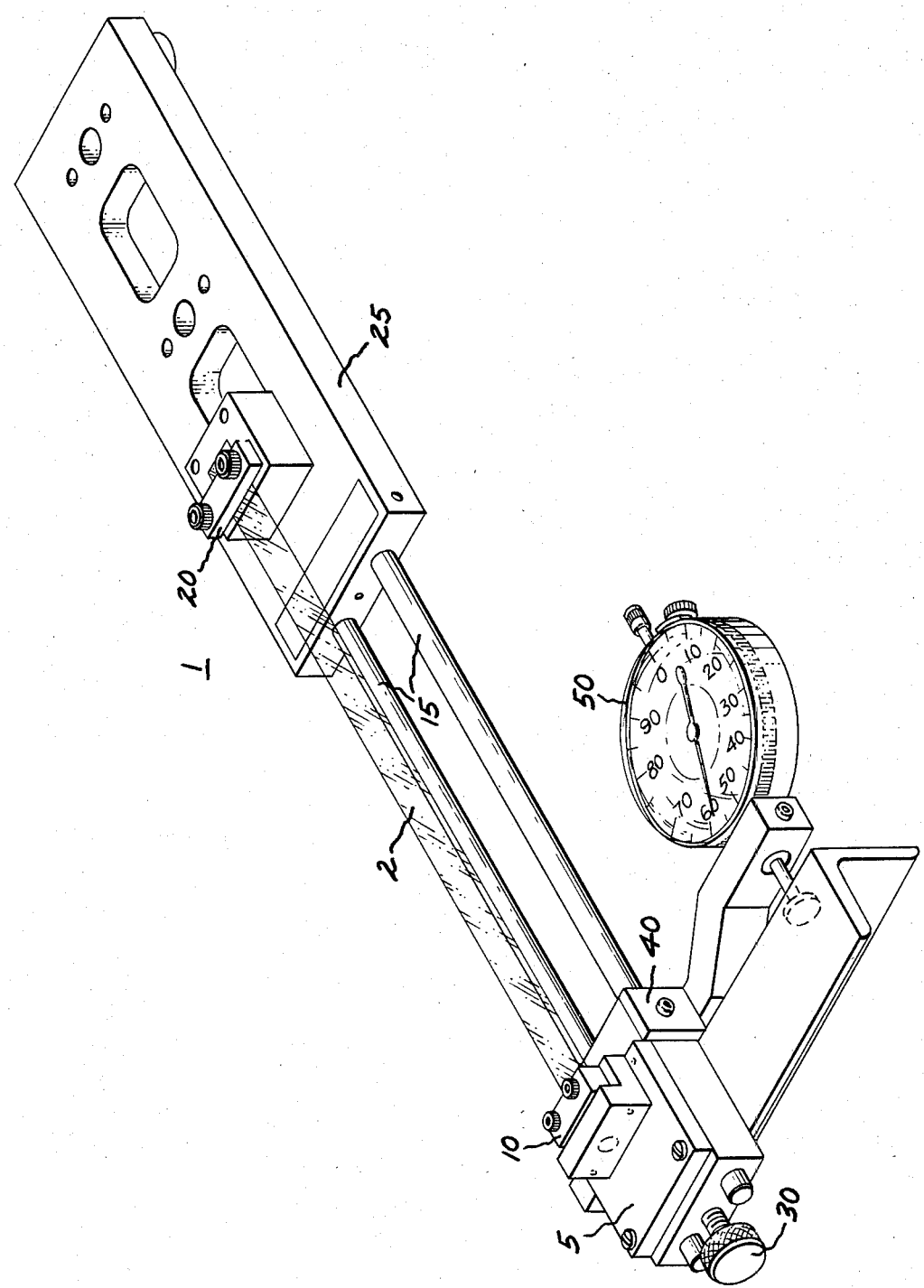

UPGRADING SILICONE RESIN COATING COMPOSITIONS

BACKGROUND OF THE INVENTION

This invention relates to a method of improving silicone resin coating compositions. More particularly, it relates to a method of upgrading silicone resin coating compositions by ultrafiltration.

Silicone resin coating compositions are presently being utilized to protect the surface of wood, metals, and synthetic polymers. These transparent coatings provide excellent mar and scratch resistance to acrylic and polycarbonate sheets used as glazing. An example of a widely used transparent polycarbonate glazing on which these coating are useful is Lexan ® polycarbonate resin sold by General Electric Company.

The silicone resin coating formulations typically comprise an aqueous dispersion of colloidal silica or silica gel and hydrolizable silanes, such as the trifunctional silanes of the formula, $R'Si(OR)_3$ and a solvent medium such as alcohol and water.

Degradation of these silicone coating compositions from prolonged exposure to moisture, humidity and ultra violet light during outdoor use, has presented certain problems. Yellowing and hazing along with delamination of these protective coatings is often observed. Attempts to enhance the longevity of such silicone coatings have included modification of the solvent carrier, as disclosed by Anthony in Ser. No. 373,361, filed Dec. 1, 1982 and modifications of the composition. These modifications include the introduction of additives to the coating as disclosed by Frye in U.S. Pat. No. 4,277,287 and altering the pH of the composition as disclosed by Vaughn, Jr. in U.S. Pat. No. 4,368,235. The above references are assigned to the same assignee as the present invention.

While the procedures mentioned above have provided acceptable coating formulations, there still remains room for improvement. For example, the method comprising this invention upgrades the coatings contained in the processes identified above in addition to providing coatings having improved resistance to ultra violet light, heat, moisture, stress and strain.

SUMMARY OF THE INVENTION

A method of improving silicone coating compositions is provided which comprises filtering a silicone resin coating composition through a filter of a size 5 microns or less.

OBJECTS OF THE INVENTION

An object of the present invention is to improve those protective silicone resin coating compositions presently in use.

Another object of the present invention is to provide a method of improving the resistance to cracking and the resistance to deterioration from heat, moisture, humidity and ultra violet light in coatings obtained from silicon resin compositions.

A further object of the present invention is to provide a method of upgrading silicon resin coating compositions without introducing additives or affecting the concentration of ingredients.

DESCRIPTION OF THE DRAWING

The FIGURE is a perspective view of a microcrackometer, a device utilized to test the stress resistance of silicon resin coating compositions on substrates.

DETAILED DESCRIPTION OF THE PREFERRED EMBODIMENTS

The desired objects of this invention and other objects are achieved by filtering a silicone resin coating composition through a filter having a size in the range of 5 microns or less prior to application on a substrate.

The term "ultrafiltration", as used herein, refers to a filtration procedure wherein a filter having a pore size of 5 microns or less is utilized. This range of filter sizes includes those procedures often referred to as "microfiltration".

Filtering of the silicone resin coating compositions can be accomplished with filters that are commercially available. Any filter comprised of an inert material, such as polypropylene, polyethylene, teflon, silicone, etc., is suitable provided it is of a size 5 microns or less. A suitable filter is Gelman filter Model No. 4280, which is a size of 0.5 microns.

The extent to which the silicone resin compositions are upgraded is proportional to the size of the filter utilized. The smaller the filter size the more the resistance to strain, stress, heat, moisture and ultra violet radiation is increased. Compositions passed through a 0.5 micron filter exhibit physical properties which are significantly improved over those filtered with 5 micron filters. Filtering silicon resin coating compositions through filters smaller than 0.5 microns is expected to improve the compositions property profiles even further. However, conventional methods for testing the effectiveness of the silicone resin coatings do not permit a quantitative evaluation of further improvements in properties.

When it is desirable to filter a silicone resin coating composition through filters smaller than 1 micron, it is preferable to utilize a series of filters of decreasing size. Often attempting to filter the silicone resin compositions by a single pass through a small filter cannot be achieved. It may be necessary to pass the composition through a series of filters to prevent clogging. A typical step down filtration procedure is to utilize a 5 micron filter, a one micron filter and then a filter of the desired size. Filters smaller than 0.02 microns cannot be utilized with the coating compositions that are presently available since this is essentially the particle size of a majority of the components in the silicone resin compositions. Therefore, a substantial portion of material will not pass through the filter.

Ultrafiltration of the silicone resin coating compositions provides improvements in properties unlike those obtained from common purification procedures utilizing filtration. Filtration procedures remove impurities to provide a pure product. In the case of silicone resin coating compositions, the purified coatings are typically clearer upon application to a substrate; however, ultrafiltration enhances properties unrelated to purification or removal of impurities, such as improved resistance to stress and strain and improved ultra violet light stability. Ultrafiltration will typically separate only 0.1% of the components within the silicon resin coating composition. The separated components are typically agglomerates of the colloidal silica.

This process will upgrade essentially any silicone resin coating composition which contains colloidal silica. The extent to which the particular silicone resin coating composition is upgraded varies with the contents of said composition. Examples of such silicone resin coating compositions are described in U.S. Pat. Nos. 4,277,287 and 4,278,804; and pending application Ser. No. 373,361. The effectiveness of ultrafiltration is dependent upon the pH of the coating composition. The coating compositions typically have a pH of from about 3.5 to about 8, preferably from about 7.1 to about 7.8. Those silicone resin coating compositions which have a pH above 7.0 have shown the greatest improvement upon ultrafiltration.

The silicone resin coating composition are comprised of the hydrolysis product of an aqueous dispersion of colloidal silica and a trifunctional silane of the formula, R'Si(OR)$_3$ wherein —OR are the functional groups, R being an alkyl radical of from 1–8 carbon atoms and R' is a monovalent radical selected from the group consisting of alkyl radicals of from 1–3 carbon atoms and aryl radicals are from 6–10 carbon atoms. The quantity of colloidal silica which may be present in the silicone resin coating compositions known to the art typically range from 0.01% by weight to 35% by weight. The quantity of trifunctional silane typically ranges from 3% to 45% by weight.

In general, the aqueous dispersion of colloidal silica utilized in the silicone resin coating compositions is characterized by a particle size of from 5–150 millimicrons, and preferably exhibit an average diameter of 10–30 millimicrons. Such dispersions are known in the art. Commercially available materials include Ludox (Dupont) and Nalcoag (Nalco Chemical Co.). The effectiveness of ultrafiltration will vary depending on the type of colloidal silica present in the silicone resin coating compositions. Where the particles are of a large diameter, ultra filtration will improve the silicone resin coating composition; however, the improvement in compositions containing colloidal silica of smaller average diameters is more pronounced. The commercially available colloidal dispersions are in the form of acidic or basic hydrosols. The more common colloidal silica-sols utilized have about 0.35% by weight Na$_2$O, which provides a slightly basic pH.

The trifunctional silanes which are utilized as starting materials in obtaining the hydrolysis product include aryltrialkoxysilanes, alkyltriacetoxysilanes and alkyltrialkyloxysilanes, the functional groups being the alkoxy and acetoxy radicals. The silane triols, R'Si(OH)$_3$, are formed in situ as a result of admixing the corresponding trifunctional silanes with the aqueous dispersion of colloidal silica. Examples of the alkoxy functional groups on the trifunctional silanes include methoxy, ethoxy, isopropoxy, and n-butoxy which, upon hydrolysis, generate the silane triols and liberate the corresponding alcohol, e.g. methanol, ethanol, isopropanol and n-butanol, and the like.

The alkyltriacetoxysilanes also generate silane triols but are principally employed to regulate the hydrolysis rate by producing acetic acid. An alternative to utilizing these trifunctional silanes to regulate the hydrolysis rate is to add glacial acetic acid or other acid to the composition.

Upon generating the hydroxyl substituents of the silane triols, R'Si(OH)$_3$, a condensation reaction begins to form silicon-oxygen-silicon bonds. This condensation reaction, which takes place over a period of time, is not exhaustive. The siloxane produced retains a quantity of silicone-bonded hydroxyl groups which render the polymer soluble in the alcohol-water solvent mixture. This soluble partial condensate can be characterized as a siloxanol polymer having at least one silicone-bonded hydroxyl group for every three —SiO— units.

A major portion of the partial condensate is typically obtained from the condensation of CH$_3$Si(OH)$_3$ depending on the input of ingredients to the hydrolysis reaction. Minor amounts of the partial condensate can also be obtained from the condensation of C$_2$H$_5$Si(OH)$_3$, C$_3$H$_7$Si(OH)$_3$ or C$_6$H$_5$Si(OH)$_3$. For most silicone resin coating compositions, it is preferable to use only methyltrimethoxysilane, thus generating only mono-methylsilanetriol and ultimately the methyl-substituted partial condensate.

The temperature of the hydrolysis reaction mixture is typically kept within the range between 20° C. to 40° C. A reaction time of about 8 hours is sufficient to react enough of the trifunctional silane such that the initial two-phase liquid mixture is converted to a single liquid phase in which the silica is dispersed. Hydrolysis is usually permitted to continue for a period of 8–24 hours. As a rule, the longer the time permitted for hydrolysis, the higher the final viscosity.

After hydrolysis has been completed, the solid content of the coating composition is typically adjusted by adding alcohol to the reaction mixture. Suitable alcohols include lower aliphatics having 1–6 carbon atoms, such as methanol, ethanol, propanol, isopropanol, and butylalcohol, tributylalcohol, and the like, or mixtures thereof. Isopropanol is typically preferred. The solvent system is a mixture of water and alcohol and typically contains from about 20–75% by weight of the alcohol to ensure that the partial condensate is soluble.

After adjustment with solvent, the coating composition usually contains from 10–50% by weight solids and preferrably has about 20% by weight of total solids. Such compositions are ready for application to a substrate and may be ultrafiltered prior to application.

Other ingredients may be present within the silicone resin coating composition without hindering the effectiveness of this process. One such ingredient is a buffered latent condensation catalyst. Examples include alkali metal salts of carboxylic acids, such as sodium acetate, potassium formate, etc.; amine carboxylates, such as dimethylamine acetate, ethanolamine acetate, dimethylanaline formate, etc; quaternary ammonium carboxylates, such as tetramethylammonium acetate, benzyltrimethylammonium acetate, etc.; metal carboxylates, such as tin octoate; amines such as triethylamine, triethanolamine, pyridine, etc; and alkali hydroxides, such as sodium hydroxide, ammonium hydroxide, etc. Other ingredients which may be present include ultraviolet light-absorbing agents such as those disclosed by Ashby et al., U.S. Pat. No. 4,278,804, Frye, U.S. Pat. No. 4,299,746 and Anthony, Ser. No. 373,361.

Suitable additives also include polysiloxane-polyether copolymers described by Frye in U.S. Pat. Nos. 4,308,315; 4,324,839 and 4,277,287. These copolymers control flow, flow marks, dirt marks, and the like on the coating surface. The preparation of this polysiloxane-polyether copolymer is described in U.S. Pat. No. 3,629,165, and incorporated herein by reference. Suitable commercially available materials are SF-1066 and SF-1141, from General Electric Company and Dow Corning's DC-190.

Other ingredients, such as thickening agents, pigments, dyes, antioxidants, adhesion promoting compounds, and the like, can also be included for their conventionally employed purposes and ultrafiltration will still improve the resistance of the silicone resin coating compositions to degradation from stress, strain, moisture, heat and ultraviolet light. Suitable thickening agents are more particularly described by Vaughn Jr., U.S. Pat. No. 4,309,319; suitable adhesion promoting compounds are disclosed by Conroy, U.S. Pat. No. 4,311,763 and suitable antioxidants are described by Anthony in pending application Ser. No. 373,361.

Upon ultrafiltration of the silicone coating compositions they can be applied to the surface of an article. Priming of the surface with a thermosetting acrylic prior to application of the filtered compositions is often preferred. Conventional methods can be used for coating the substrate with the filtered composites, such as spraying or dip coating to form a continuous film or layer. The cured filtered compositions are useful as protective coatings on a wide variety of surfaces, including plastic surfaces and metal surfaces. Examples of such plastics include synthetic organic polymer substrates, such as acrylic polymers, polyesters, polyamides, polyimides, acrylonitrile-styrene copolymers, styrene-acrylonitrile-butadieneterpolymers, polyvinyl chloride, butyrates, polyethylene, etc.

Special mention is made of the polycarbonates, such as those polycarbonates known as Lexan ® polycarbonate resin, available from General Electric Company. Ultrafiltration of coatings is especially useful when they are utilized on such articles. Other types of substrates include wood, leather, glass, ceramic, textiles, etc.

The silicone resin coating is obtained by removing the solvent and other volatile materials from the filtered composition. The coating air-dries to a substantially tack free condition, but heating in the range of 75° C. to 200° C. is necessary to obtain condensation of residual silanols in the partial condensate. Final cure typically results in the formation of a silsesquioxane ($R'SiO_{3/2}$). In the cured coating, the ratio of $R'SiO_{3/2}$ to $SiO_2$ is preferably equal to 2. The coating thickness can be varied, but in general, the coating will have a thickness in the range between 0.5 to 20 microns.

In order that those skilled in the art will be better able to practice the invention, the following examples are given by way of illustration and not by way of limitation.

EXPERIMENTAL

A microcrackometer was used to evaluate the stress and strain resistance of silicone resin coatings. Samples of coated substrates were placed into the microcrackometer and were stretched. The stretched samples were observed for the formation of cracks. The strain applied to the samples at the initial formation of cracks was noted and compared to values obtained for other coated samples. The strain applied to the samples in the microcrackometer was equal to $\Delta L/L$, where L is the length of the sample and $\Delta L$ is the length the sample was stretched at the initial formation of cracks.

The drawing illustrates a microcrackometer (1). The sample (2) is anchored to a moving gripping means (10) attached to sliding base (5) and a fixed gripping means (20) attached to base (25). The sliding base (5) slides on rods (15) by rotating an adjusting screw (30). Turning the adjusting screw (30) stretches the coated sample (2) by sliding the moving gripping means (10) away from base (40). The value $\Delta L$ is obtained from the dial micrometer (50), which measures the distance the moving gripping means (10) is moved from base (40).

Samples of coatings were prepared for testing in the following manner. A 4 inch piece of 10 mil Lexan ® polycarbonate resin film 12 inches long was flow coated at room temperature and allowed to air dry until tacky to the touch (approximately 4.5 minutes). The coated film was then cut into strips ½ inch wide and 12 inches long using an Ingenito paper cutter. This procedure was used in order to minimize the influence of boundary effects produced by the cutting. The strips were allowed to air dry for another 25 minutes and then cured in an air oven for 90 minutes at 135° C. The strips were mounted in the microcrackometer with the initial length preset at 10 inches.

A QUV Q panel was utilized to evaluate the ultraviolet light humidity and thermal resistance of silicone resin coated Lexan ® samples. The samples were exposed to 8 hours of ultra violet light at about 70° C. and then allowed to cool for four hours in darkness to permit condensation. This cycle was repeated until cracks or flaws were observed. Samples were prepared for QUV testing by flow coating 4 by 4 inch Lexan ® polycarbonate resin specimens which were ¼ inch thick. After air drying for 30 minutes they were cured in an air oven for 90 minutes at 130° C. After cooling to room temperature, scribed and unscribed adhesion were checked. They were also visually inspected for flaws prior to placement in the QUV apparatus and then checked periodically for crack formation.

EXAMPLE 1

Methyltrimethoxysilane (20.3 gms), 0.06 grams of acetic acid, 16.7 grams of Ludox LS colloidal silica (30% colloid) were added to a reaction vessel. The two phase solution was stirred at a temperature within the range of about 20°–30° C. for 16 hours. Isobutanol (38 grams) was then introduced, followed by 0.6 grams of flow modifier SF-1066, described in the references cited above and sold by General Electric Company. In addition, 3.2 grams of a silylated hydroxybenzophenone UV stabilizer of the formula below was introduced.

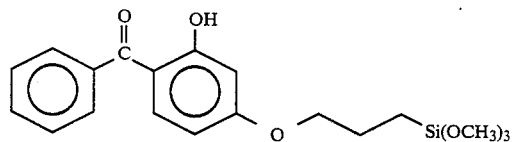

The mixture was stirred at room temperature for 10 days before use. The composition was them applied to a Lexan ® polycarbonate substrate and tested in the microcrackometer and QUV apparatus as described above. The results of these tests appear in Table I along with the measurement of other physical properties. This silicone resin composition was then pressure filtered utilizing a 0.5 micron Gelman filter, Model No. 4280. This coating solution was then placed on Lexan ® polycarbonate resin substrates and analyzed in the microcrackometer and QUV apparatus as described above. The results from the microcrackometer and QUV apparatus appear in Table I, along with measurements of other physical properties.

EXAMPLE 2

To a mixture of 20.3 grams methyltrimethoxysilane and 0.06 grams of acedic acid, 16.7 grams of Ludox LS colloidal silica (30% colloid) was added, the two phase solution was stirred at 20° C. for 16 hours. Isobutanol (38 grams) was then introduced, followed by 0.6 grams of flow modifier SF 1066 as described in Example I, and 3.2 grams of silylated hydroxybenzophenone UV stabilizer of the formula below.

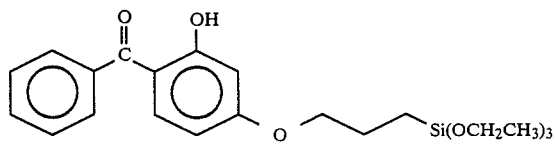

The mixture was stirred in at room temperature for 10 days before use. The coating solution was applied to Lexan ® polycarbonate resin substrates and tested in the microcrackometer and QUV apparatus as described above. The results of these tests and measurements of other physical properties appear in Table I. A portion of the coating solution was pressure filtered utilizing a 0.5 micron Gelman filter Model No. 4280. The filtered solution was applied to Lexan ® polycarbonate resin substrate and tested in the micro crackometer and QUV apparatus as described above. These results and the measurements of other physical data appear in Table I.

TABLE 1

| Material | Particle Size (Microns) | Strain $\frac{\Delta L}{L}$ $(10^{-2})$ | QUV (hours) |
| --- | --- | --- | --- |
| Example I | 1.3–1.5 | 1.0 | 950 |
| Example I (filtered) | 0.30–0.35 | 1.9 | 1500 |
| Example II | 4.5–5.0 | 0.5 | 700 |
| Example II (filtered) | 0.56–0.65 | 1.4 | 1100 |

The above examples are directed to only a few of the silicon resin coating compositions which may be upgraded by ultrafiltration, the present invention further includes the upgrading of other silicone resin coating compositions. In addition, further modifications are possible by one skilled in the art without departing from the scope and spirit of this invention.

What is claimed is:

1. A method of improving silicone resin coating compositions comprising filtering said silicon resin coating compositions through a filter having a size of 5 microns or less.

2. A method of improving silicone resin coating compositions comprising colloidal silica, said method comprising filtering said silicone resin coating compositions through a series of filters of decreasing size, said filters having a size in the range of 5 microns to 0.1 microns.

3. A method of improving silicone resin coating compositions comprised of from about 10 to about 50 weight percent solids dispersed in a water/alcohol dispersion medium, said solids comprising from about 10–17 weight percent colloidal silica and about 30–90 weight percent of a partial condensate obtained from a trifunctional silane having the formula R′Si(OR)$_3$, wherein R′ is selected from the group consisting of alkyl radicals having 1 to 3 carbon atoms and aryl radicals having from 6 to 13 carbon atoms and R is selected from a group consisting of alkyl radicals having from 1 to 13 carbon atoms and aryl radicals having from 6 to 20 carbon atoms, at least 70% of which is CH$_3$Si(OR)$_3$; said method comprising filtering said silicone resin coating compositions through a filter having a size in the range of 5 to 0.1 microns.

4. A method of improving the silicone resin coating compositions of claim 3 which contain one or more additives selected form the group consisting of ultraviolet light absorbing agents, antioxidants, thickening agents, pigments, dyes, cure catalysts and flow modifiers, said method comprising filtering said silicone resin coating compositions through a filter having a size in the range of 1 to 0.5 microns.

5. A method of improving silicone resin coating compositions as in claim 4, wherein said silicone resin coating compositions contain a methoxy-alkoxy silylalkyl benzophenone and a polysiloxane polyether copolymer.

6. A silicone resin coating composition obtained by the method comprising filtering a silicone resin coating composition through a filter having a size in the range of 5 to 0.1 microns, said silicone resin coating composition being comprised of from about 10–50 weight percent solids dispersed in a water/alcohol dispersion medium, said solids comprising from about 10–70 weight percent colloidal silica and about 30–90 weight percent of a partial condensate obtained from a trifunctional silane having the formula R′Si(OR)$_3$, wherein R′ is selected from the group consisting of alkyl radicals having 1–3 carbon atoms and aryl radicals having from 6–13 carbon atoms and R is selected from a group consisting of alkyl radicals having from 1–13 carbon atoms and aryl radicals having from 6–20 carbon atoms, at least 70% of which is CH$_3$Si(OR)$_3$.

7. A silicone resin coating composition as in claim 6 which contains one or more additives selected from the group consisting of ultra violet light absorbing agents, antioxidants, thickening agents, pigments, dyes, cure catalysts and flow modifiers.

8. A silicone resin coating composition as in claim 7 which contains a methoxy-alkoxy silylalkyl benzophenone, a polysiloxane polyether copolymer and a quaternary ammonium carboxylate selected from the group consisting of benzyltrimethylammonium acetate and tetramethylammonium acetate.

9. A silicone resin coating composition obtained by filtering a silicone resin coating composition comprising colloidal silica through a filter having a size of 5 microns or less.

* * * * *